(12) United States Patent
Jindou et al.

(10) Patent No.: US 11,054,187 B2
(45) Date of Patent: Jul. 6, 2021

(54) HEAT EXCHANGER AND METHOD OF MANUFACTURING SAME

(71) Applicant: DAIKIN INDUSTRIES, LTD., Osaka (JP)

(72) Inventors: Masanori Jindou, Settsu (JP); Masahiro Tsutsui, Sakai (JP); Akihisa Sugita, Sakai (JP); Motofumi Shimizu, Sakai (JP); Yoshio Oritani, Settsu (JP); Takuya Kazusa, Saka (JP); Junichi Hamadate, Sakai (JP); Tomohiko Sakamaki, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 163 days.

(21) Appl. No.: 15/542,629

(22) PCT Filed: Jan. 6, 2016

(86) PCT No.: PCT/JP2016/050247
§ 371 (c)(1),
(2) Date: Jul. 10, 2017

(87) PCT Pub. No.: WO2016/117357
PCT Pub. Date: Jul. 28, 2016

(65) Prior Publication Data
US 2018/0266769 A1    Sep. 20, 2018

(30) Foreign Application Priority Data

Jan. 19, 2015   (JP) .............................. JP2015-008124

(51) Int. Cl.
*F28D 1/053*   (2006.01)
*F16B 2/08*    (2006.01)
(Continued)

(52) U.S. Cl.
CPC ............ *F28D 1/05375* (2013.01); *B23K 3/00* (2013.01); *B23P 21/00* (2013.01); *F16B 2/08* (2013.01);
(Continued)

(58) Field of Classification Search
CPC ...... F28D 1/05375; F28D 1/00; F28D 1/0471; F28D 2021/0068; F16B 2/08; F25B 39/00;
(Continued)

(56) References Cited

U.S. PATENT DOCUMENTS 3,144,081 A * 8/1964 Skiba ................... F28D 7/06
165/162
3,324,942 A * 6/1967 Miller .................. F28D 7/06
165/158
(Continued)

FOREIGN PATENT DOCUMENTS

EP    2 883 802 A1   6/2015
JP    48-25467 Y     7/1973
(Continued)

OTHER PUBLICATIONS

Notification of Reasons for Refusal of corresponding JP Application No. 2015-008124 dated Mar. 25, 2016.
(Continued)

*Primary Examiner* — Tho V Duong
*Assistant Examiner* — Raheena R Malik
(74) *Attorney, Agent, or Firm* — Global IP Counselors, LLP

(57) ABSTRACT

A heat exchanger includes a plurality of members made of aluminum or aluminum alloy, and a bundling component. The bundling component includes a main body portion having an anchoring portion, and a band portion extending from the main body portion and having a section on an
(Continued)

opposite side of a main body portion side anchored in the anchoring portion. The bundling component is made of aluminum or aluminum alloy. At least part of the bundling component and at least part of the plurality of members are secured to each other with a brazing material interposed between the parts.

4 Claims, 15 Drawing Sheets

(51) Int. Cl.

| | | |
|---|---|---|
| *F28F 9/02* | (2006.01) | |
| *F28F 19/06* | (2006.01) | |
| *F28F 21/08* | (2006.01) | |
| *F28D 1/047* | (2006.01) | |
| *F28F 1/32* | (2006.01) | |
| *B23P 21/00* | (2006.01) | |
| *B23K 3/00* | (2006.01) | |
| *F28F 19/00* | (2006.01) | |
| *F25B 39/00* | (2006.01) | |
| *F28D 1/00* | (2006.01) | |
| *F28D 21/00* | (2006.01) | |
| *F25B 13/00* | (2006.01) | |
| *F25B 39/02* | (2006.01) | |
| *F25B 39/04* | (2006.01) | |

(52) U.S. Cl.
CPC ............... *F25B 39/00* (2013.01); *F28D 1/00* (2013.01); *F28D 1/0471* (2013.01); *F28F 1/325* (2013.01); *F28F 9/028* (2013.01); *F28F 9/0275* (2013.01); *F28F 19/00* (2013.01); *F28F 19/06* (2013.01); *F28F 21/089* (2013.01); *F25B 13/00* (2013.01); *F25B 39/02* (2013.01); *F25B 39/04* (2013.01); *F28D 2021/0068* (2013.01); *F28F 9/0212* (2013.01); *F28F 2215/12* (2013.01); *F28F 2250/06* (2013.01); *F28F 2275/00* (2013.01); *F28F 2275/04* (2013.01); *F28F 2275/08* (2013.01)

(58) Field of Classification Search
CPC .......... F25B 13/00; F25B 39/02; F25B 39/04; B23K 3/00; B23P 21/00; F28F 1/325; F28F 9/0275; F28F 9/028; F28F 19/00; F28F 19/06; F28F 21/089; F28F 2275/08; F28F 9/0212; F28F 2215/12; F28F 2250/06; F28F 2275/00; F28F 2275/04
USPC ........................................................ 165/173
See application file for complete search history.

(56) References Cited

U.S. PATENT DOCUMENTS

| | | | | |
|---|---|---|---|---|
| 4,265,301 A * | 5/1981 | Anderson | ................ | F28D 7/16 165/162 |
| 4,344,480 A * | 8/1982 | Boyer | .................. | F28F 9/0135 165/162 |
| 5,083,346 A * | 1/1992 | Orton | ........................ | F16B 2/08 24/16 PB |
| 5,472,047 A * | 12/1995 | Welkey | ................. | F28D 7/0041 165/160 |
| 5,899,263 A * | 5/1999 | Tokutake | .............. | F28D 1/0535 165/173 |
| 6,161,614 A * | 12/2000 | Woodhull, Jr. | ..... | F28D 1/05333 165/144 |
| 6,364,005 B1 * | 4/2002 | Makino | ................ | F28D 1/0435 165/135 |
| 9,709,192 B1 * | 7/2017 | Newcomb | ............... | F16B 19/00 |
| 2008/0296005 A1 * | 12/2008 | Taras | ..................... | F25B 13/00 165/173 |
| 2011/0073277 A1 * | 3/2011 | Karl | ........................ | F24F 13/30 165/67 |
| 2013/0306285 A1 * | 11/2013 | Jindou | .................... | F25B 39/00 165/173 |
| 2014/0259566 A1 * | 9/2014 | Rouleau | ................ | F16B 5/0685 24/457 |

FOREIGN PATENT DOCUMENTS

| | | |
|---|---|---|
| JP | 49-41034 Y | 11/1974 |
| JP | 53-1570 U | 1/1978 |
| JP | 60-154682 U | 10/1985 |
| JP | 62-19760 A | 1/1987 |
| JP | 2-263566 A | 10/1990 |
| JP | 3-238165 A | 10/1991 |
| JP | 8-195121 A | 7/1996 |
| JP | 2004-42247 A | 2/2004 |
| JP | 2005-195050 A | 7/2005 |
| JP | 2007-192496 A | 8/2007 |
| JP | 2007-322130 A | 12/2007 |
| JP | 2009-25002 A | 2/2009 |
| JP | 2011-89710 A | 5/2011 |
| JP | 2012-163328 A | 8/2012 |
| JP | 2013-217594 A | 10/2013 |
| JP | 2014-137155 A | 7/2014 |
| WO | 2014/024295 A1 | 2/2014 |

OTHER PUBLICATIONS

Notification of Reasons for Refusal of corresponding JP Application No. 2015-008124 dated Oct. 11, 2016.
International Search Report of corresponding PCT Application No. PCT/JP2016/050247 dated Apr. 5, 2016.
International Preliminary Report of corresponding PCT Application No. PCT/JP2016/050247 dated Jan. 6, 2016.
European Search Report of corresponding EP Application No. 16 73 9964.1 dated Oct. 8, 2018.

* cited by examiner

HEAT EXCHANGER AND METHOD OF MANUFACTURING SAME

CROSS-REFERENCE TO RELATED APPLICATIONS

This U.S. National stage application claims priority under 35 U.S.C. § 119(a) to Japanese Patent Application No. 2015-008124, filed in Japan on Jan. 19, 2015, the entire contents of which are hereby incorporated herein by reference.

TECHNICAL FIELD

The present invention relates to a heat exchanger and a method of manufacturing the same.

BACKGROUND ART

Conventionally, there have been heat exchangers whose headers, flat tubes, and fins are configured by aluminum or aluminum alloy.

For example, in the heat exchanger disclosed in JP-A No. 2014-137155, securing headers, flat tubes, and fins configured by aluminum or aluminum alloy to each other by brazing or welding is described.

SUMMARY

Technical Problem

With respect to this, sometimes it becomes difficult to perform spot welding in a case where, for example, space for working is small. Furthermore, sometimes brazing becomes difficult in places where it is difficult to dispose a brazing material. Furthermore, even supposing that the securing is able to be accomplished by these processes, sometimes it becomes difficult to sufficiently enhance the securing strength and ensure reliability.

Here, in the case of using even more parts when performing the securing, there is the concern that galvanic corrosion will end up occurring between the securing targets and those parts.

The present invention has been made in view of the aforementioned points, and it is a problem of the present invention to provide a heat exchanger that can strongly secure plural parts while controlling galvanic corrosion and a method of manufacturing the same.

Solution to Problem

A heat exchanger pertaining to a first aspect includes plural members made of aluminum or aluminum alloy and a bundling component. The bundling component has a main body portion and a band portion and is made of aluminum or aluminum alloy. The main body portion includes an anchoring portion. The band portion extends from the main body portion, and its section on the opposite side of the main body portion side is anchored in the anchoring portion. The bundling component is brazed and secured to the plural members in a state in which the bundling component is bundling together the plural members.

Here, the "heat exchanger" is not particularly limited and may be a heat exchanger equipped with heat transfer tubes and fins, and in a case where the heat exchanger has a distributor and a header which are other members and pipes other than heat transfer tubes and fins, these are included in the heat exchanger.

In this heat exchanger, the plural members and the bundling component are all made of aluminum or aluminum alloy, so it becomes possible to control the occurrence of corrosion. Furthermore, by putting the plural members into a furnace in a state in which the plural members are bundled together by the bundling component, it becomes possible to facilitate the operation of putting the plural members into the furnace. Moreover, because the bundling component is made of aluminum or aluminum alloy and is not made of resin, for example, the bundling component can withstand the temperature in the furnace. Moreover, because the bundling component used to bundle together the plural members is brazed and secured to the plural members, it becomes possible to strongly secure the plural members.

A heat exchanger pertaining to a second aspect is the heat exchanger pertaining to the first aspect, wherein the bundling component is brazed and secured to the plural members by brazing in a furnace while maintaining the state in which the plural members are bundled together by the bundling component.

In this heat exchanger, when putting the plural members into the furnace, it becomes possible to keep the plural members from coming apart and to control brazing problems.

A heat exchanger pertaining to a third aspect is the heat exchanger pertaining to the first aspect or the second aspect, wherein the plural members include a header and plural intercommunicating pipes. The inside of the header is partitioned into plural spaces. Each intercommunicating pipe interconnects the plural spaces inside the header. The bundling component is brazed and secured to the plural intercommunicating pipes in a state in which the bundling component is bundling together the plural intercommunicating pipes.

In this heat exchanger, it becomes possible to strongly secure the plural intercommunicating pipes.

A heat exchanger pertaining to a fourth aspect is the heat exchanger pertaining to the first aspect or the second aspect, wherein the plural members include a distributor and a header. The bundling component is brazed and secured to both the distributor and the header in a state in which the bundling component is bundling together the distributor and the header.

In this heat exchanger, it becomes possible to strongly secure the distributor and the header.

A heat exchanger pertaining to a fifth aspect is the heat exchanger pertaining to any of the first aspect to the fourth aspect, wherein the sections of the plural members bundled together by the bundling component extend in a same direction. The bundling component further has a clip made of aluminum or aluminum alloy. The clip has a section whose width in the direction in which the sections of the plural members bundled together by the bundling component commonly extend is larger than that of the band portion, and the clip is capable of sandwiching the plural members. The plural members are brazed and secured to the bundling component in a state in which the plural members are bundled together by the clip sandwiching the plural members, the main body portion, and the band portion.

This heat exchanger uses the clip having the section whose width in the direction in which the sections of the plural members bundled together by the bundling component extend is greater than that of the band portion, so it becomes possible to more stably secure the plural members.

A heat exchanger manufacturing method pertaining to a sixth aspect is a method of manufacturing a heat exchanger having plural members made of aluminum or aluminum alloy, the heat exchanger manufacturing method including a first step and a second step. In the first step, the plural members are bundled together with a bundling component made of aluminum or aluminum alloy. In the second step, the plural members and the bundling component are put into a furnace, while maintaining the state in which the plural members are bundled together by the bundling component, and the plural members and the bundling component are brazed.

In the heat exchanger obtained by this heat exchanger manufacturing method, the plural members and the bundling component are both made of aluminum or aluminum alloy, so it becomes possible to control the occurrence of corrosion. Furthermore, by putting the plural members into the furnace in a state in which the plural members are bundled together by the bundling component, it becomes possible to facilitate the operation of putting the plural members into the furnace. Moreover, because the bundling component is made of aluminum or aluminum alloy and is not made of resin, for example, the bundling component can withstand the temperature in the furnace. Moreover, because the bundling component used to bundle together the plural members is brazed and secured to the plural members, it becomes possible to strongly secure the plural members.

Advantageous Effects of Invention

The heat exchanger pertaining to the first aspect and the heat exchanger obtained by the heat exchanger manufacturing method of the sixth aspect can strongly secure plural parts while controlling galvanic corrosion.

In the heat exchanger pertaining to the second aspect, when putting the plural members into the furnace, it becomes possible to keep the plural members from coming apart and to control brazing problems.

In the heat exchanger pertaining to the third aspect, it becomes possible to strongly secure the plural intercommunicating pipes.

In the heat exchanger pertaining to the fourth aspect, it becomes possible to strongly secure the distributor and the header.

In the heat exchanger pertaining to the fifth aspect, a more stable securing of the plural members becomes possible.

DESCRIPTION OF EMBODIMENT

An air conditioning system 1 equipped with a heat exchanger pertaining to an embodiment of the present invention will be described below with reference to the drawings.

(1) Overall Configuration of Air Conditioning System 1

Figure 1:
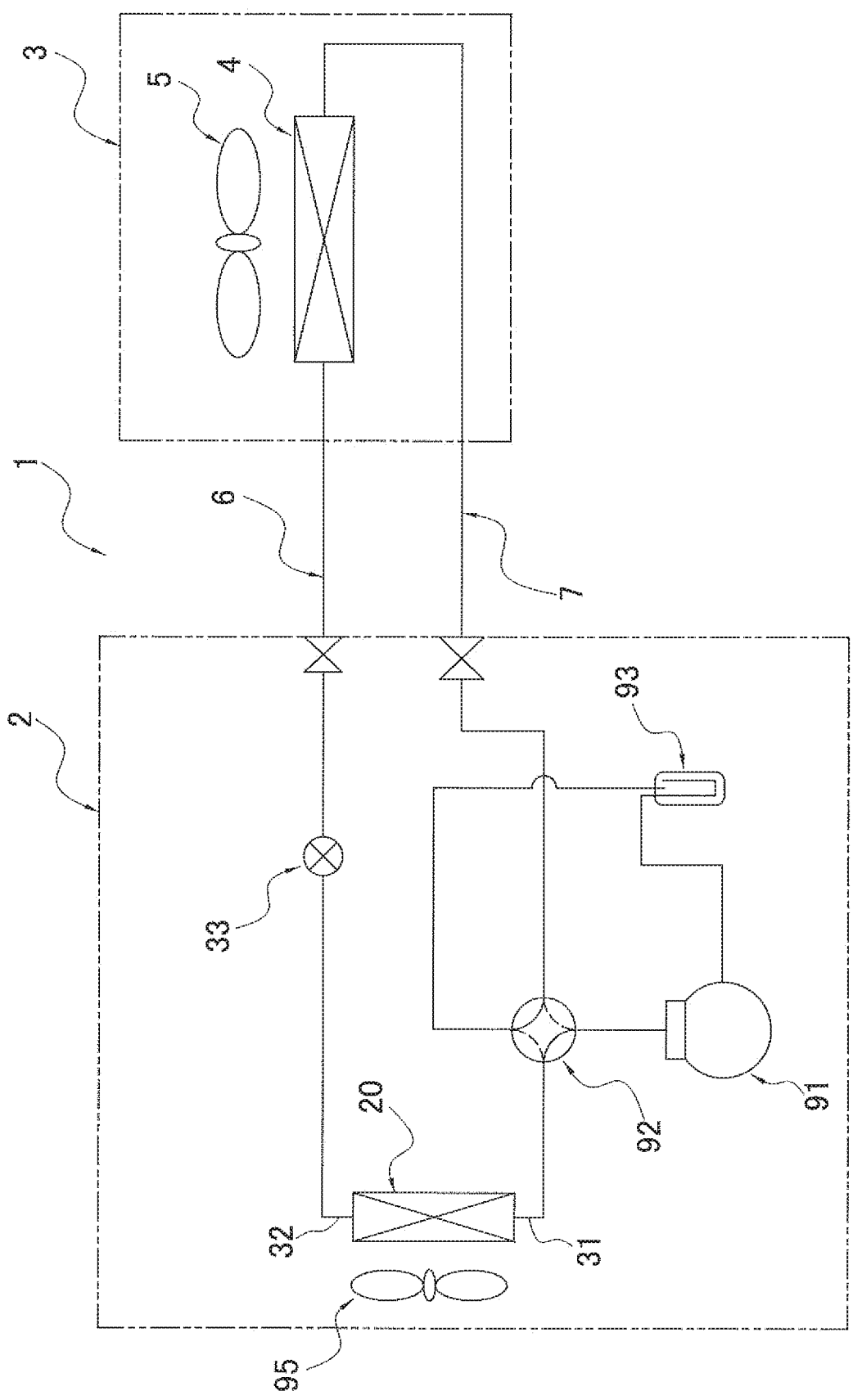
FIG. 1 is a circuit diagram for describing an overview of a configuration of an air conditioning system pertaining to an embodiment.

FIG. 1 is a circuit diagram showing an overview of the configuration of the air conditioning system 1 pertaining to the embodiment of the present invention.

The air conditioning system 1 is a system used to cool and heat the inside of a building in which an air conditioning indoor unit 3 is installed by performing a vapor compression refrigeration cycle operation, and is configured as a result of an air conditioning outdoor unit 2 serving as a heat source-side unit and an air conditioning indoor unit 3 serving as a utilization-side unit being interconnected by refrigerant intercommunicating pipes 6 and A refrigerant circuit configured as a result of the air conditioning outdoor unit 2, the air conditioning indoor unit 3, and the refrigerant intercommunicating pipes 6 and 7 being interconnected is configured as a result of a compressor 91, a four-way switching valve 92, an outdoor heat exchanger 20 (heat exchanger), an expansion valve 33, an indoor heat exchanger 4, and an accumulator 93 being interconnected by refrigerant pipes. The refrigerant circuit is charged with refrigerant, and a refrigeration cycle operation wherein the refrigerant is compressed, is cooled, has its pressure reduced, is heated and evaporated, and thereafter is again compressed take place. As the refrigerant, a refrigerant selected from R410A, R32, R407C, R22, R134a, and carbon dioxide, for example, is used.

(2) Detailed Configuration of Air Conditioning System 1

(2-1) Air Conditioning Indoor Unit 3

The air conditioning indoor unit 3 is installed, for example, by being mounted on a wall surface in a room or by being embedded in or suspended from a ceiling in a room of a building or the like. The air conditioning indoor unit 3 has the indoor heat exchanger 4 and an indoor fan 5. The indoor heat exchanger 4 is, for example, a cross fin-type fin and tube heat exchanger configured by heat transfer tubes and numerous fins, and is a heat exchanger which, during the cooling operation, functions as a refrigerant evaporator to cool the room air and which, during the heating operation, functions as a refrigerant condenser to heat the room air.

(2-2) Air Conditioning Outdoor Unit 2

Figure 2:
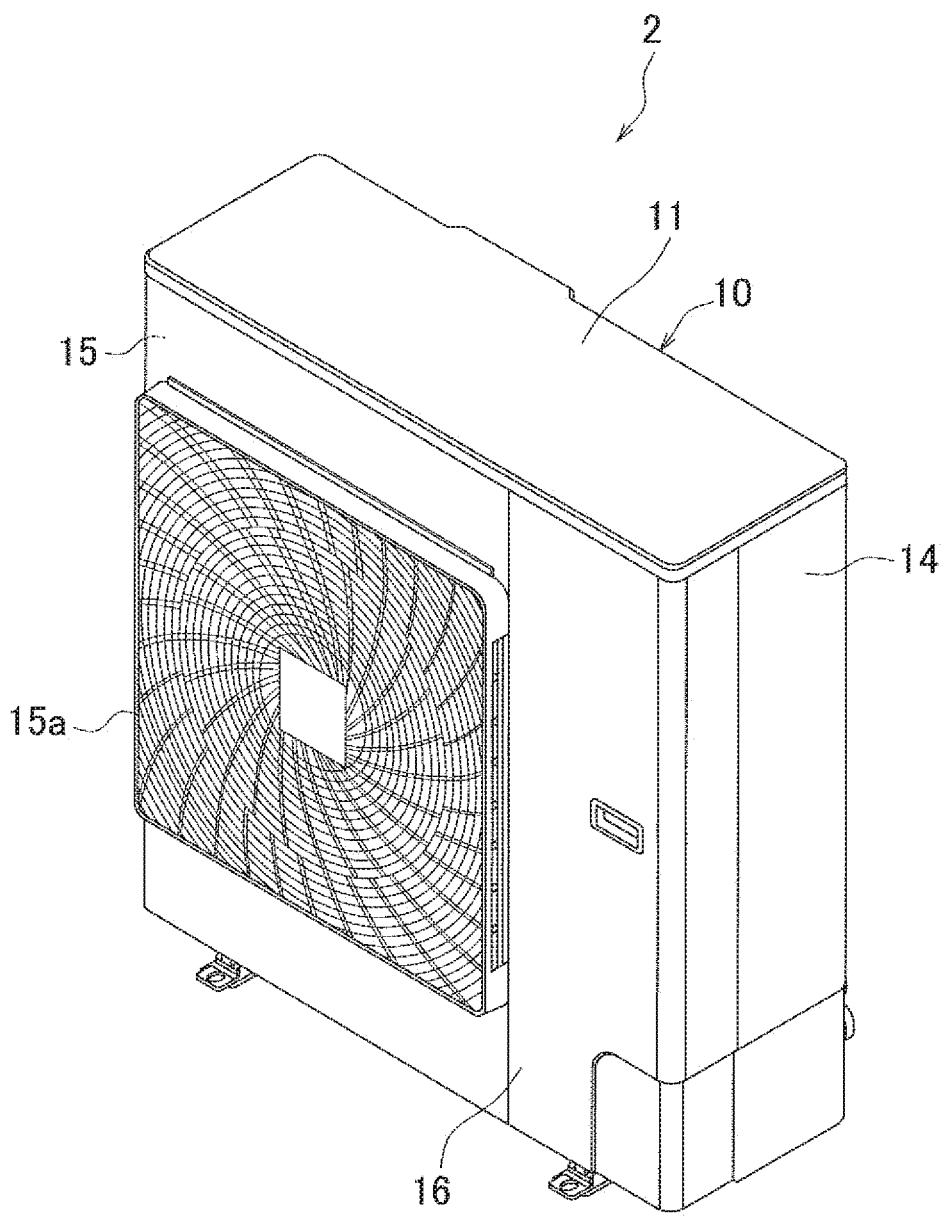
FIG. 2 is a perspective view showing the exterior of an air conditioning outdoor unit.
Figure 3:
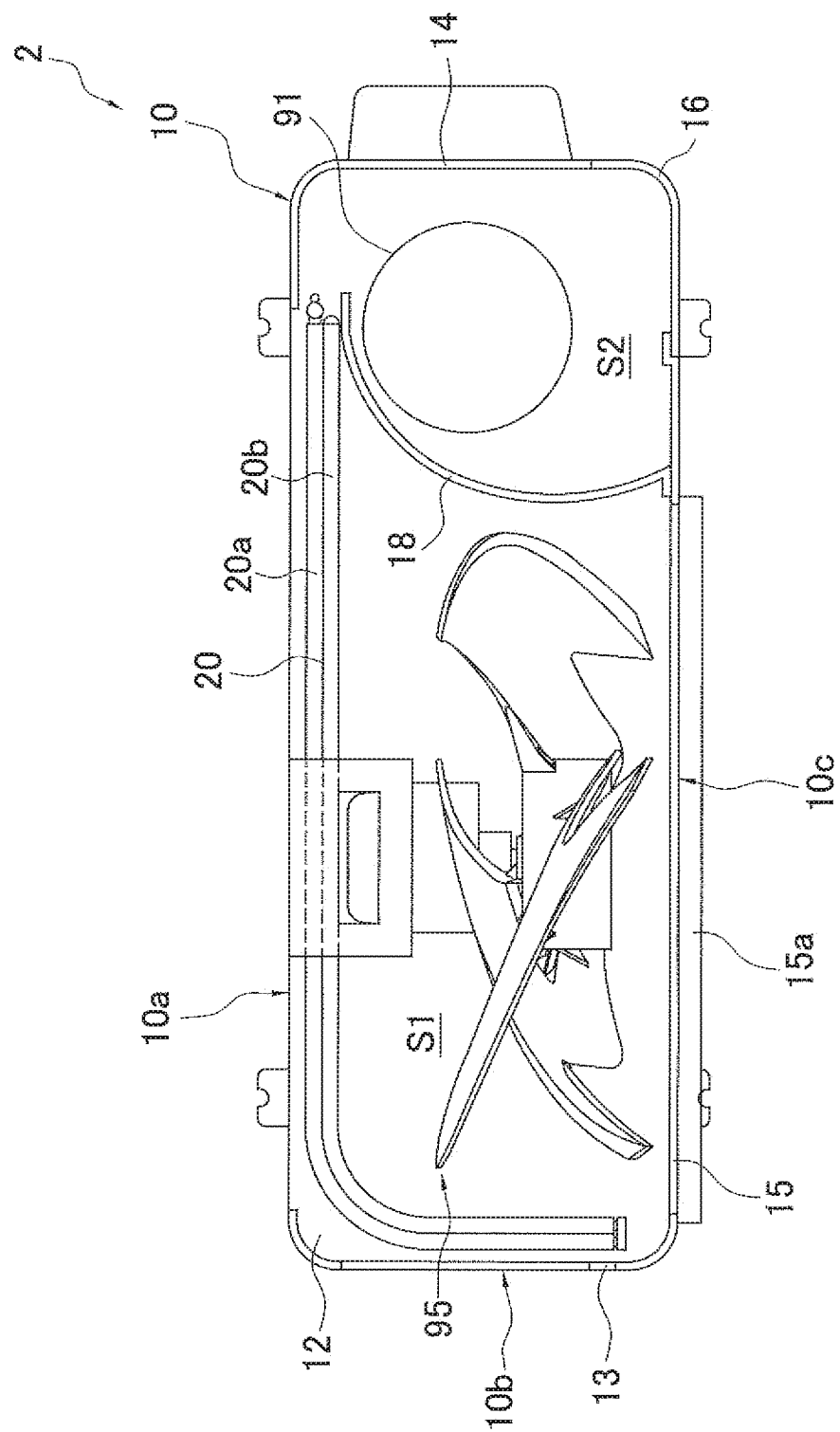
FIG. 3 is a general top sectional view describing the dispositions of various devices in the air conditioning outdoor unit.

The air conditioning outdoor unit 2 is installed outside the building or the like and is connected to the air conditioning indoor unit 3 via the refrigerant intercommunicating pipes 6 and 7. As shown in FIG. 2 and FIG. 3, the air conditioning outdoor unit 2 has a unit casing 10 that is substantially cuboidal in shape.

As shown in FIG. 3, the air conditioning outdoor unit 2 has a structure (a so-called trunk structure) where a blower compartment S1 and a machine compartment S2 are formed as a result of the inside space of the unit casing 10 being divided in two by a partition plate 18 extending in the vertical direction. The air conditioning outdoor unit 2 has the outdoor heat exchanger 20 and an outdoor fan 95 disposed inside the blower compartment S1 of the unit casing 10 and has the compressor 91, the four-way switching valve 92, the accumulator 93, the expansion valve 33, a gas refrigerant pipe 31, and a liquid refrigerant pipe 32 disposed inside the machine compartment S2 of the unit casing 10.

The unit casing 10 is equipped with a bottom plate 12, a top plate 11, a blower compartment-side side plate 13, a machine compartment-side side plate 14, a blower compartment-side front plate 15, and a machine compartment-side front plate 16 to configure a casing.

The air conditioning outdoor unit 2 is configured to suck outdoor air into the blower compartment S1 located inside the unit casing 10 from the back surface and one of the side surfaces of the unit casing 10 and thereafter blow out the sucked-in outdoor air from the front surface of the unit casing 10. Specifically, an air inlet 10a, an air inlet 10b, and an air outlet 10c are formed with respect to the blower compartment S1 located inside the unit casing 10. The air inlet 10a and the air inlet 10b as a whole extend from the front surface-side end portion of the blower compartment-side side plate 13 to the blower compartment S1-side end portion of the machine compartment-side side plate 14. Furthermore, the air outlet 10c is provided in the blower compartment-side front plate 15, and its front side is covered by a fan grille 15a.

The four-way switching valve 92 is a mechanism for switching the direction of the flow of the refrigerant. During the cooling operation, the four-way switching valve 92 interconnects a refrigerant pipe on the discharge side of the compressor 91 and the gas refrigerant pipe 31 extending from one end (the gas-side end portion) of the outdoor heat exchanger 20 and also interconnects, via the accumulator 93, the refrigerant intercommunicating pipe 7 for gas refrigerant and a refrigerant pipe on the suction side of the compressor 91 (see the solid lines of the four-way switching valve 92 in FIG. 1). Furthermore, during the heating operation the four-way switching valve 92 interconnects the refrigerant pipe on the discharge side of the compressor 91 and the refrigerant intercommunicating pipe 7 for gas refrigerant and also interconnects, via the accumulator 93, the suction side of the compressor 91 and the gas refrigerant pipe 31 extending from the one end (the gas-side end portion) of the outdoor heat exchanger 20 (see the dashed lines of the four-way switching valve 92 in FIG. 1).

The outdoor heat exchanger 20 is disposed standing up in the up and down direction (vertical direction) so as to oppose the air inlets 10a and 10b in the blower compartment S1. The outdoor heat exchanger 20 is a heat exchanger made of aluminum, and in the present embodiment a heat exchanger having a design pressure of about 3 MPa to 4 MPa is used.

The gas refrigerant pipe 31 extends from the one end (the gas-side end portion) of the outdoor heat exchanger 20 so as to be connected to the four-way switching valve 92. Furthermore, the liquid refrigerant pipe 32 extends from the other end (the liquid-side end portion) of the outdoor heat exchanger 20 so as to be connected to the expansion valve 33.

The accumulator 93 is connected between the four-way switching valve 92 and the compressor 91. The accumulator 93 has a gas/liquid separating function of separating the refrigerant into its gas phase and its liquid phase. The refrigerant flowing into the accumulator 93 is separated into its liquid phase and its gas phase, and the gas-phase refrigerant that collects in the upper space is supplied to the compressor 91.

The expansion valve 33 is a mechanism for reducing the pressure of the refrigerant in the refrigerant circuit, and is an electrically powered valve whose opening degree is adjustable. The expansion valve 33 is provided between the outdoor heat exchanger 20 and the refrigerant intercommunicating pipe 6 for liquid refrigerant in order to adjust the refrigerant pressure and the refrigerant flow rate and has the function of causing the refrigerant to expand both during the cooling operation and during the heating operation.

The outdoor fan 95 supplies, to the outdoor heat exchanger 20, outdoor air for exchanging heat with the refrigerant flowing in the outdoor heat exchanger 20. The outdoor fan 95 is disposed in the blower compartment S1 so as to oppose the outdoor heat exchanger 20. The outdoor fan 95 sucks the outdoor air into the unit from the back surface side, causes heat exchange to take place between the refrigerant and the outdoor air in the outdoor heat exchanger 20, and thereafter discharges the air after heat exchange to the outside of the unit from the front surface side.

(3) Operation of Air Conditioning System 1

(3-1) Cooling Operation

During the cooling operation the four-way switching valve 92 is in the state indicated by the solid lines in FIG. 1, namely, a state where the discharge side of the compressor 91 is connected via the gas refrigerant pipe 31 to the gas side of the outdoor heat exchanger 20 and where the suction side of the compressor 91 is connected via the accumulator 93 and the refrigerant intercommunicating pipe 7 to the gas side of the indoor heat exchanger 4. The opening degree of the expansion valve 33 is adjusted so that the degree of superheating of the refrigerant in the outlet of the indoor heat exchanger 4 (that is, the gas side of the indoor heat exchanger 4) becomes fixed (degree of superheating control). When the compressor 91, the outdoor fan 95, and the indoor fan 5 are operated in this state of the refrigerant circuit, low-pressure gas refrigerant is compressed by the compressor 91 to become high-pressure gas refrigerant. The high-pressure gas refrigerant is sent via the four-way switching valve 92 to the outdoor heat exchanger 20. Thereafter, the high-pressure gas refrigerant exchanges heat with the outdoor air supplied by the outdoor fan 95, condenses, and becomes high-pressure liquid refrigerant in the outdoor heat exchanger 20. Then, the high-pressure liquid refrigerant that has reached a supercooled state is sent from the outdoor heat exchanger 20 to the expansion valve 33. The refrigerant whose pressure has been reduced close to the suction pressure of the compressor 91 by the expansion valve 33 to become refrigerant in a low-pressure gas-liquid two-phase state is sent to the indoor heat exchanger 4, exchanges heat with the room air, evaporates, and becomes low-pressure gas refrigerant in the indoor heat exchanger 4.

The low-pressure gas refrigerant is sent via the refrigerant intercommunicating pipe 7 to the air conditioning outdoor unit 2 and is sucked back into the compressor 91. In this way, in the cooling operation the air conditioning system 1 causes the outdoor heat exchanger 20 to function as a condenser of the refrigerant compressed in the compressor 91 and causes the indoor heat exchanger 4 to function as an evaporator of the refrigerant condensed in the outdoor heat exchanger 20.

(3-2) Heating Operation

During the heating operation the four-way switching valve 92 is in the state indicated by the dashed lines in FIG. 1, namely, a state where the discharge side of the compressor 91 is connected via the refrigerant intercommunicating pipe 7 to the gas side of the indoor heat exchanger 4 and where the suction side of the compressor 91 is connected via the gas refrigerant pipe 31 to the gas side of the outdoor heat exchanger 20. The opening degree of the expansion valve 33 is adjusted so that the degree of supercooling of the refrigerant in the outlet of the indoor heat exchanger 4 becomes fixed at a degree of supercooling target value (degree of supercooling control). When the compressor 91, the outdoor fan 95, and the indoor fan 5 are operated in this state of the refrigerant circuit, low-pressure gas refrigerant is sucked into the compressor 91, compressed, becomes high-pressure gas refrigerant, and is sent via the four-way switching valve 92 and the refrigerant intercommunicating pipe 7 to the air conditioning indoor unit 3.

Then, the high-pressure gas refrigerant that has been sent to the conditioning indoor unit 3 exchanges heat with the room air, condenses, and becomes high-pressure liquid refrigerant in the indoor heat exchanger 4, and thereafter has its pressure reduced in accordance with the valve opening degree of the expansion valve 33 when the refrigerant passes through the expansion valve 33. The refrigerant that has passed through the expansion valve 33 flows into the outdoor heat exchanger 20. Then, the refrigerant in the low-pressure gas-liquid two-phase state that has flowed into the outdoor heat exchanger 20 exchanges heat with the outdoor air supplied by the outdoor fan 95, evaporates, becomes low-pressure gas refrigerant, and is sucked back into the compressor 91 via the four-way switching valve 92. In this way, in the heating operation the air conditioning system 1 causes the indoor heat exchanger 4 to function as a condenser of the refrigerant compressed in the compressor 91 and causes the outdoor heat exchanger 20 to function as an evaporator of the refrigerant condensed in the indoor heat exchanger 4.

(4) Detailed Configuration of Outdoor Heat Exchanger 20

(4-1) Overall Configuration of Outdoor Heat Exchanger 20

Figure 4:
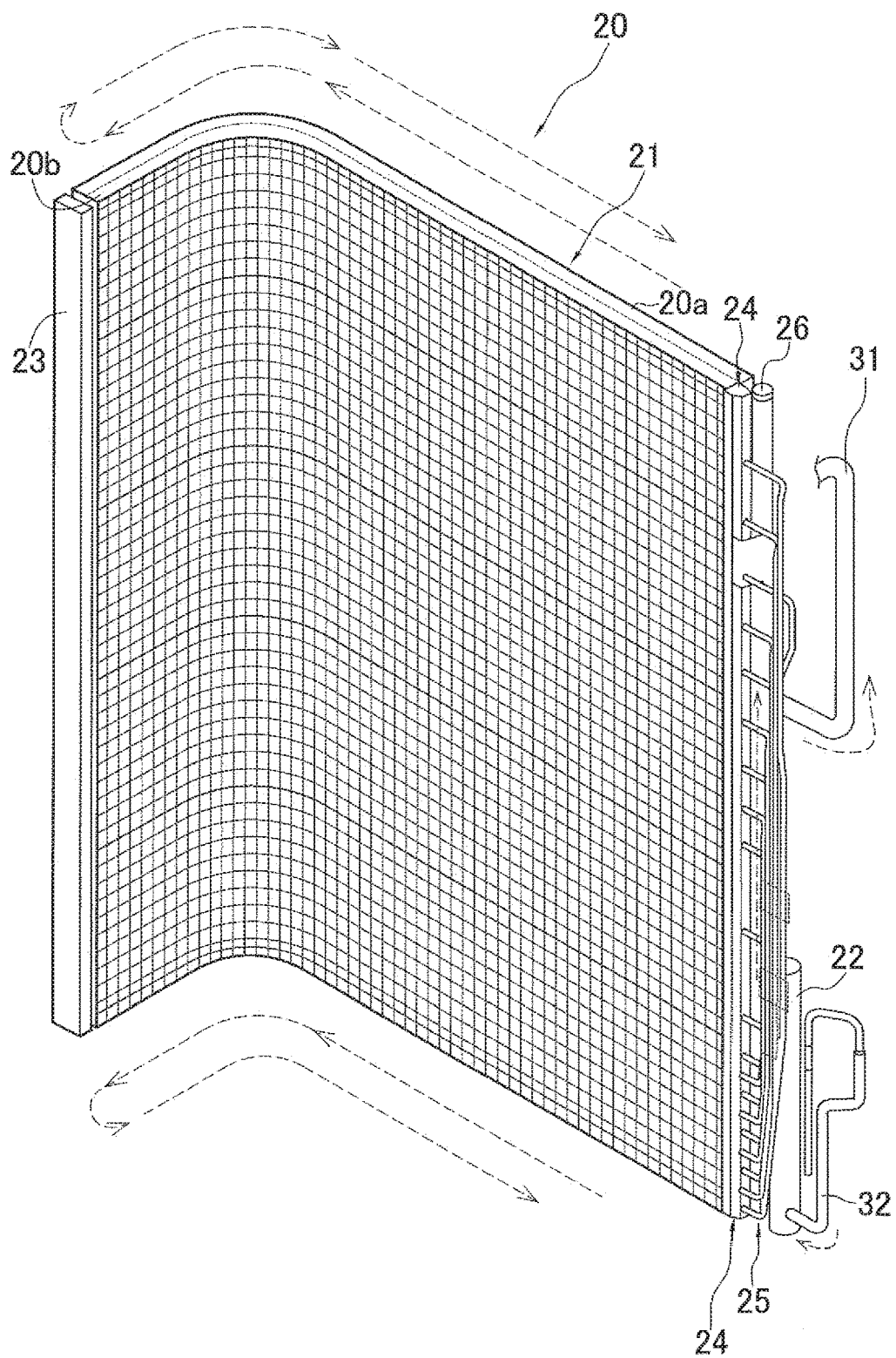
FIG. 4 is a general external perspective view showing an outdoor heat exchanger.
Figure 5:
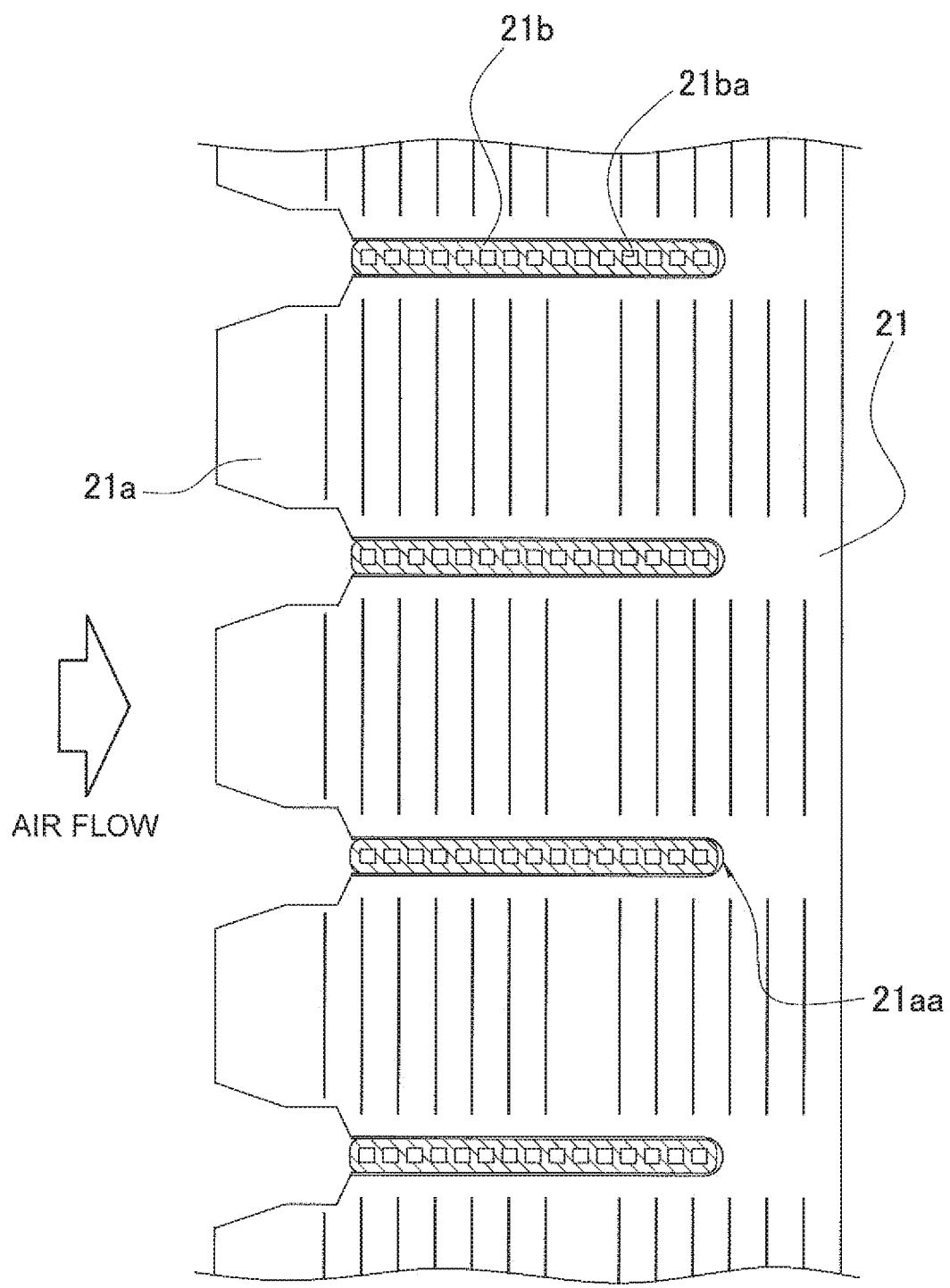
FIG. 5 is a side view showing a state in which heat transfer fins are attached to multi-hole flat tubes in the outdoor heat exchanger.

FIG. 4 is a general external perspective view of the outdoor heat exchanger 20. Furthermore, FIG. 5 shows a state where heat transfer fins 21*a* are attached to multi-hole flat tubes 21*b*.

The outdoor heat exchanger 20 is equipped with a heat exchange component 21 that causes heat exchange to take place between the outdoor air and the refrigerant, an inlet/outlet header 26 and a return header 24 provided on one end side of the heat exchange component 21, a coupling header 23 provided on the other end side of the heat exchange component 21, an intercommunicating component 25 that couples the lower portion of the return header 24 and the upper portion of the return header 24 to each other, and a distributor 22 that guides distributed refrigerant to the lower portion of the inlet/outlet header 26.

(4-2) Heat Exchange Component 21

The heat exchange component 21 is configured by numerous heat transfer fins 21*a* and numerous multi-hole flat tubes 21*b*. The heat transfer fins 21*a* and the multi-hole flat tubes 21*b* are both made of aluminum or aluminum alloy.

As shown in FIG. 5, the heat transfer fins 21*a* are tabular members, and cutouts 21*aa* that extend in the horizontal direction and are for inserting the flat tubes are formed in each of the heat transfer fins 21*a*. The cutouts 21*aa* are provided in the heat transfer fins 21*a* in such a way that there are plural cutouts adjacent to each other in the up and down direction. It should be noted that the heat transfer fins 21*a* are attached in such a way that they have countless sections that project toward the upstream side of the air flow.

The multi-hole flat tubes 21*b* function as heat transfer tubes and transfer, to the refrigerant flowing inside them, the heat moving between the heat transfer fins 21*a* and the outdoor air. The multi-hole flat tubes 21*b* have upper and lower planar portions that become heat transfer surfaces and plural inflow openings 21*ba* through which the refrigerant flows. The plural inflow openings 21*ba* in the multi-hole flat tubes 21*b* are adjacent to each other in the direction of the air flow passing through the outdoor heat exchanger 20. The multi-hole flat tubes 21*b* having this kind of shape are plurally provided, and these plural tubes are disposed a predetermined interval apart from each other in the vertical direction.

It should be noted that the heat exchange component 21 has, in the direction of the air flow produced by the outdoor fan 95 (a flow heading from the back surface and left side surface sides of the casing to the fan grille 15*a* located on the front of the casing), an upwind-side heat exchange component 20*a* provided in such a way as to frame the upwind section and a downwind-side heat exchange component 20*b* provided in such a way as to frame the downwind side. The upwind-side heat exchange component 20*a* and the downwind-side heat exchange component 20*b* are disposed in two rows adjacent to each other in the air flow direction.

The upwind-side heat exchange component 20*a* has the plural multi-hole flat tubes 21*b*, which extend in such a way as to frame the upwind side and are adjacent to each other in the up and down direction, and the heat transfer fins 21*a*, which are secured to the multi-hole flat tubes 21*b*. Furthermore, the downwind-side heat exchange component 20*b* also has the plural multi-hole flat tubes 21*b*, which extend in such a way as to frame the downwind side and are adjacent to each other in the up and down direction, and the heat transfer fins 21*a*, which are secured to the multi-hole flat tubes 21*b*.

(4-3) Distributor 22

The distributor 22 is connected in such a way as to couple the liquid refrigerant pipe 32 and the lower section of the inlet/outlet header 26 to each other. When, for example, the outdoor heat exchanger 20 functions as a refrigerant evaporator, the distributor 22 distributes, in its height direction, the refrigerant flowing thereto from the liquid refrigerant pipe 32, and the flows of refrigerant distributed by the distributor 22 are guided via height positions in the lower section of the inlet/outlet header 26 to the lower section of the upwind-side heat exchange component 20*a* (see the dotted lines in FIG. 4), (4-4) Inlet/Outlet Header 26

The inlet/outlet header 26 is a tubular member that is made of aluminum or aluminum alloy and extends in the vertical direction, and the inside of the inlet/outlet header 26 is divided into an upper section and a lower section. Specifically, the inside of the inlet/outlet header 26 is vertically partitioned by a baffle extending in the horizontal direction.

The lower section of the inlet/outlet header 26 functions as a refrigerant inlet when the outdoor heat exchanger 20 functions as a refrigerant evaporator, and functions as a refrigerant outlet when the outdoor heat exchanger 20 functions as a refrigerant radiator. Furthermore, the upper section of the inlet/outlet header 26 functions as a refrigerant outlet when the outdoor heat exchanger 20 functions as a refrigerant evaporator, and functions as a refrigerant inlet when the outdoor heat exchanger 20 functions as a refrigerant radiator.

The lower section of the inlet/outlet header 26 is connected via the distributor 22 to the liquid refrigerant pipe 32. The upper section of the inlet/outlet header 26 is connected to the gas refrigerant pipe 31.

Furthermore, the lower section of the inlet/outlet header 26 has plural spaces vertically adjacent to each other so that the distribution, in the height direction, of the refrigerant distributed by the distributor 22 when the outdoor heat exchanger 20 functions as an evaporator is maintained. These spaces are demarcated as a result of the inside space in the lower section of the inlet/outlet header 26 being vertically partitioned by plural baffles. Because of this, the spaces are configured in such a way that the flows of refrigerant that have been divided in the height direction by the distributor 22 can be sent, with their divided state of distribution being maintained, to the heat exchange component 21 via the lower section of the inlet/outlet header 26.

Because of the above configuration, in a case where the outdoor heat exchanger 20 functions as a refrigerant evaporator, the refrigerant that has flowed into the heat exchange component 21 via the liquid refrigerant pipe 32, the distributor 22, and the lower section of the inlet/outlet header 26 evaporates while passing through each of the members below and reaches the upper section of the inlet/outlet header 26. Then, the evaporated refrigerant flows out to the outside of the outdoor heat exchanger 20 via the upper section of the inlet/outlet header 26 and the gas refrigerant pipe 31. It should be noted that in a case where the outdoor heat exchanger 20 functions as a refrigerant radiator, the flow becomes the opposite of what is described above.

(4-5) Coupling Header 23

The coupling header 23 is provided on the opposite side (the blower compartment side in FIG. 3) of the end portion of the heat exchange component 21 on the side (the machine compartment side in FIG. 3) where the inlet/outlet header 26 and the return header 24 are provided in the outdoor heat exchanger 20.

The coupling header 23 is configured to guide the refrigerant that has flowed through the multi-hole flat tubes 21b of the upwind-side heat exchange component 20a to the multi-hole flat tubes 21b of the downwind-side heat exchange component 20b located in the same height positions or guide the refrigerant that has flowed through the multi-hole flat tubes 21b of the downwind-side heat exchange component 20b to the multi-hole flat tubes 21b of the upwind-side heat exchange component 20a located in the same height positions. Here, the direction of the flows of refrigerant flowing through the section of the coupling header 23 located in a height position corresponding to the lower section of the inlet/outlet header 26 and the direction of the flows of refrigerant flowing through the section of the coupling header 23 located in a height position corresponding to the upper section of the inlet/outlet header 26 are mutually opposite directions. Specifically, in a case where the outdoor heat exchanger 20 functions as a refrigerant evaporator, the lower section of the coupling header 23 guides the refrigerant that has flowed through the upwind-side heat exchange component 20a to the downwind-side heat exchange component 20b, and the upper section of the coupling header 23 guides the refrigerant that has flowed through the downwind-side heat exchange component 20b to the upwind-side heat exchange component 20a (see the dotted lines in FIG. 4). In a case where the outdoor heat exchanger 20 functions as a refrigerant radiator, the flows of refrigerant become the opposite of what is described above.

No movement of refrigerant in the up and down direction occurs in the coupling header 23, and the coupling header 23 fulfills the role of simply interconnecting, at the same height positions, flows paths of the refrigerant inside the outdoor heat exchanger 20.

(4-6) Return Header 24 and Intercommunicating Component 25

The return header 24 is provided on the end portion of the heat exchange component 21 on the opposite side of the end portion on the side where the coupling header 23 is provided, and extends in the up and down direction further on the downwind side than the inlet/outlet deader tube 26. The return header 24 is connected to the end portion of the downwind-side heat exchange component 20b of the heat exchange component 21 on the opposite side of the coupling header 23 side. The return header 24 is also a member made of aluminum or aluminum alloy.

The intercommunicating component 25 has plural intercommunicating pipes 25a to 25j, which are pipes made of aluminum or aluminum alloy connected to the return header 24. The plural intercommunicating pipes 25a to 25j interconnect, in a one to one ratio, lower spaces and upper spaces of the space plurally partitioned inside the return header 24. In the present embodiment, each of the intercommunicating pipes 25a to 25j has an open cylinder shape.

Figure 6:
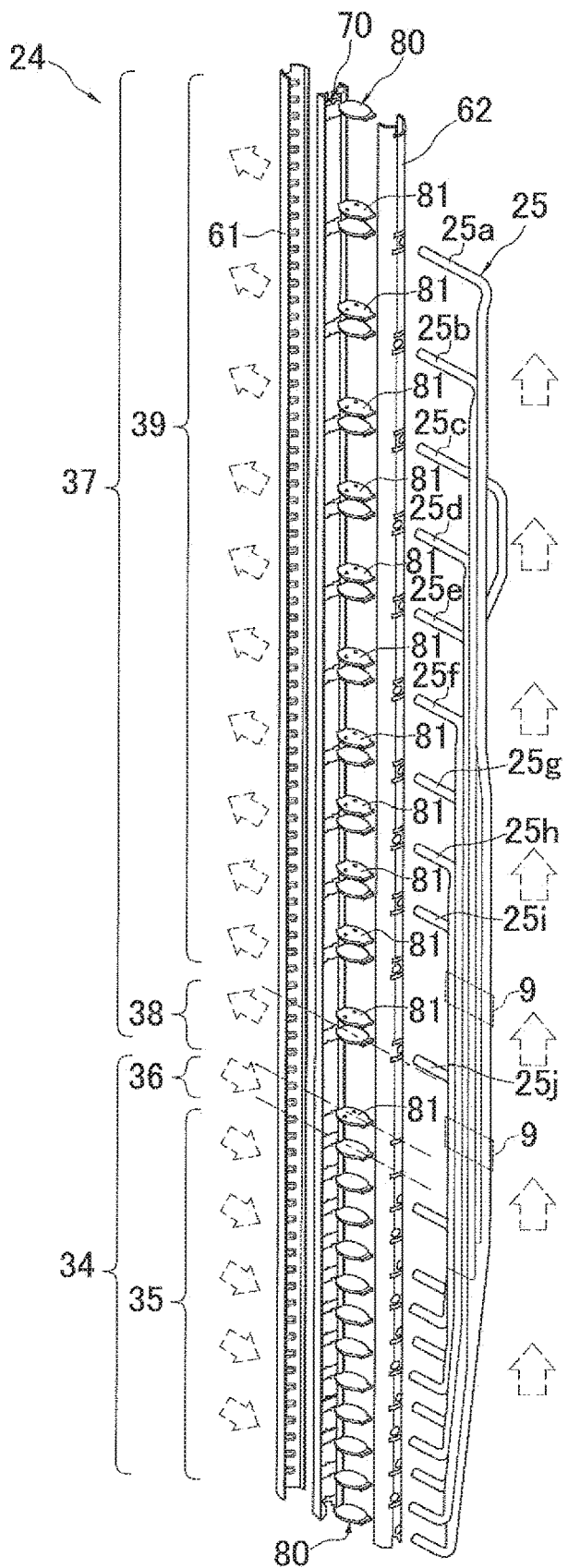
FIG. 6 is an exploded general perspective view of a return header and an intercommunicating component.

The return header 24 has, as shown in the exploded general perspective view of the return header 24 and the intercommunicating component 25 in FIG. 6, a multi-hole-side member 61 to which one ends of the plural multi-hole flat tubes 21b are connected, a pipe-side member 62 that configures the opposite side of the side to which the multi-hole flat tubes 21b are connected, a partition member 70 that is positioned between the multi-hole-side member 61 and the pipe-side member 62, and plural baffles 80 that vertically partition the space inside the return header 24.

The return header 24 is a structure that is configured by putting together these plural members and is long in the vertical direction. The return header 24 is configured as a result of the members other than the partition member 70 being secured to the partition member 70 that is mainly one part, so it is easy perform mutual positioning, it is easy to ensure strength, and manufacturing can be facilitated even with a structure that is long in the vertical direction.

The multi-hole-side member 61 configures the wall surface of the return header 24 on the heat exchange component 21 side and is formed in a substantially semicircular arc shape as seen in a top view. The multi-hole-side member 61 has a shape where this semicircular arc shape extends in the up and down direction, and plural openings that penetrate the multi-hole-side member 61 in its thickness direction and are for inserting the multi-hole flat tubes 21b are provided in every height position in the multi-hole-side member 61.

The pipe-side member 62 configures the wall surface on the opposite side of the heat exchange component side 21 out of the wall surfaces of the return header 24 and is formed in a substantially semicircular arc shape as seen in a top view. The pipe-side member 62 has a shape where this semicircular arc shape extends in the up and down direction. Plural openings that penetrate the pipe-side member 62 in its thickness direction and are for inserting the intercommunicating pipes 25a to 25j of the intercommunicating component 25 are provided in every height position in the pipe-side member 62. Furthermore, openings for securing one end sides of the baffles 80 are provided in every height position in the pipe-side member 62.

The partition member 70 extends forward and backward as well as upward and downward in such a way as to partition the space inside the return header 24 into a space on the multi-hole-side member 61 side and a space on the pipe-side member 62 side. Openings for inserting and securing the baffles 80 are provided in every height position in the partition member 70.

As shown in FIG. 6, the inside space of the return header 24 is vertically divided, by an ascending flow forming member 81 provided with nozzles, into a lower return section 34 below and an upper return section 37 above.

The inside space of the lower return section 34 is further vertically divided by a baffle 80 into a first lower return section 35 below and a second lower return section 36 above. It should be noted that the inside of the first lower return section 35 is further partitioned into plural spaces in the up and down direction by plural baffles 80.

The inside space of the upper return section 37 is also further divided in the up and down direction by a baffle 80 into a first upper return section 38 below and a second upper return section 39 above. It should be noted that the inside of the second upper return section 39 is further partitioned into plural spaces in the up and down direction by plural baffles 80. Plural multi-hole flat tubes 21b are connected to each of the spaces partitioned inside the second upper return section 39. An ascending flow forming member 81 provided with nozzles for forming an ascending flow is provided in each of the spaces partitioned inside the second upper return section 39. For this reason, it is possible to deliver the refrigerant to each of the plural multi-hole flat tubes 21h connected at different height positions to each of the spaces partitioned inside the second upper return section 39.

It should be noted that none of the intercommunicating pipes 25a to 25j are connected to the second lower return section 36 or the first upper return section 38, so the refrigerant that has flowed into the second lower return section 36 ascends inside the return header 24 via the ascending flow forming member 81 provided with nozzles and flows out from the first upper return section 38, or the refrigerant that has flowed into the first upper return section 38 descends inside the return header 24 via the ascending flow forming member 81 provided with nozzles and flows out from the second lower return section 36.

The intercommunicating pipes 25a to 25j of the intercommunicating component 25 each vertically interconnect, in a one to one ratio, one of the plural spaces partitioned in the up and down direction by the plural baffles 80 inside the first lower return section 35 and one of the plural spaces partitioned in the up and down direction by the plural baffles 80 inside the second upper return section 39. It should be noted that in the present embodiment the intercommunicating pipe 25a of the intercommunicating component 25 interconnects the uppermost space in the second upper return section 39 and the lowermost space in the first lower return section 35 out of the inside space of the return header 24. Furthermore, the intercommunicating pipe 25b of the intercommunicating component 25 interconnects the second space from the top in the second upper return section 39 and the second space from the bottom in the first lower return section 35 out of the inside space of the return header 24. In this way, the intercommunicating pipes 25a to 25j of the intercommunicating component 25 interconnect the spaces in descending order of intercommunicating distance.

In the state of connection described above, in a case where the outdoor heat exchanger 20 functions as a refrigerant evaporator, the refrigerant that has flowed into the first lower return section 35 via the lower section of the downwind-side heat exchange component 20b of the heat exchange component 21 is sent via the intercommunicating pipes 25a to 25j of the intercommunicating component 25 to the second upper return section 39. Furthermore, the refrigerant that has flowed into the second lower return section 36 from the heat exchange component 21 is sent via the space inside the return header 24, and not via the intercommunicating component 25, to the first upper return section 38. Here, the refrigerant that has been sent to the second upper return section 39 and the first upper return section 38 is sent to the upper section of the downwind-side heat exchange component 20b of the heat exchange component 21.

Here, the number of the multi-hole flat tubes 21b connected to the second upper return section 39 is configured to be greater than the number of the multi-hole flat tubes 21b connected to the first lower return section 35. Furthermore, the number of the multi-hole flat tubes 21b connected to the first upper return section 38 is configured to be greater than the number of the multi-hole flat tubes 21b connected to the second lower return section 36.

It should be noted that the refrigerant that flows into the first lower return section 35 via the lower section of the downwind-side heat exchange component 20b of the heat exchange component 21 flows, while maintaining its state of distribution as state of distribution in which the refrigerant is divided among the plural multi-hole flat tubes 21b vertically adjacent to each other in the lower section of the downwind-side heat exchange component 20b), through each of the spaces vertically partitioned by the baffles 80 inside the first lower return section 35. The refrigerant flowing through each of the spaces inside the first lower return section 35 in this way flows, while maintaining its state of distribution, through the intercommunicating pipes 25a to 25j of the intercommunicating component 25 and flows, while maintaining its state of distribution (a state of distribution in which the refrigerant is divided among the intercommunicating pipes 25a to 25j of the intercommunicating component 25), through each of the spaces vertically partitioned by the baffles 80 inside the second upper return section 39.

(5) Bundling Together of Intercommunicating Pipes 25a to 25j of Intercommunicating Component 25 by Bundling Components 9

The intercommunicating pipes 25a to 25i of the intercommunicating component 25 are brazed and secured to each other in a state in which they are bundled together by plural bundling components 9, whose general dispositions are indicated by dotted lines in FIG. 6.

Figure 7:
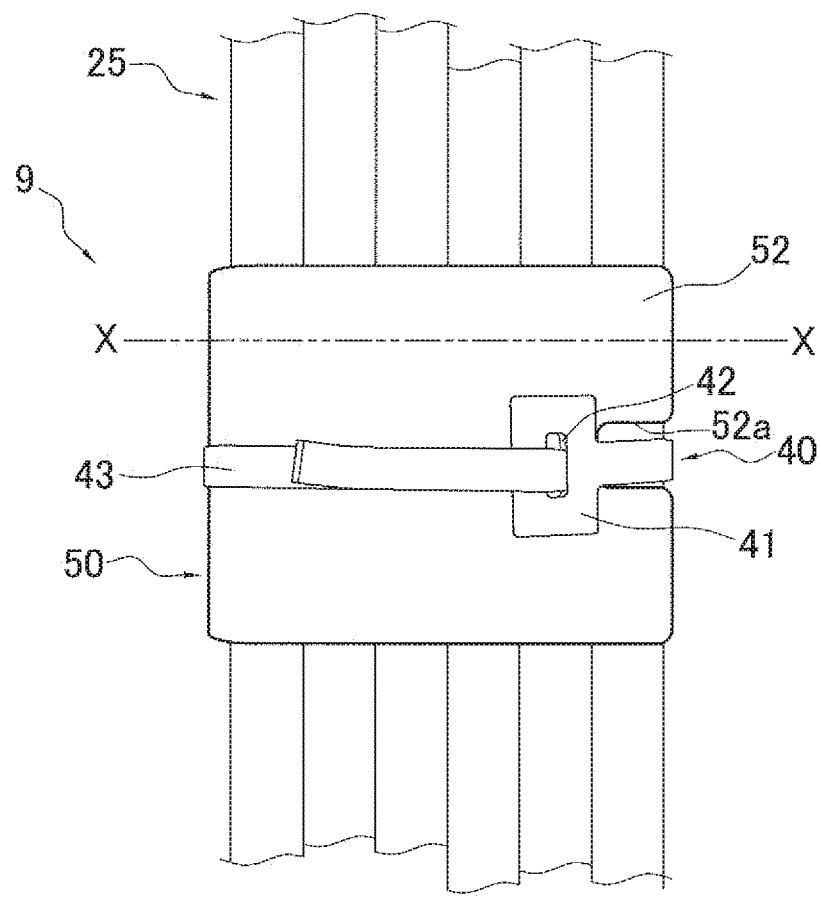
FIG. 7 is a front view showing an example where intercommunicating pipes are bundled together by a bundling component.
Figure 8:
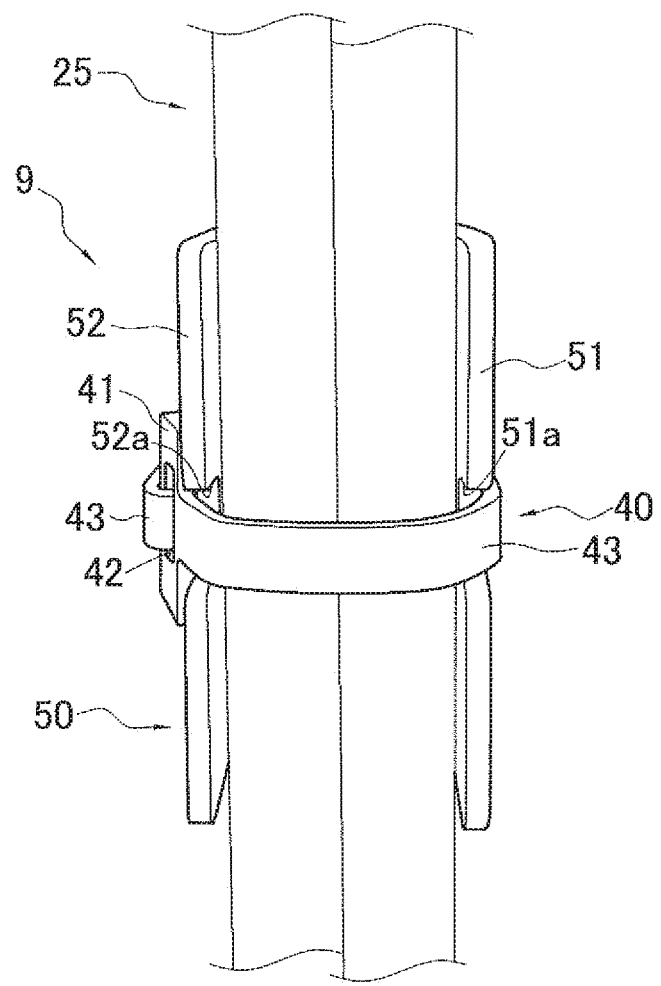
FIG. 8 is an external perspective view showing an example where the intercommunicating pipes are bundled together by the bundling component (a view seen from the return header side).
Figure 9:
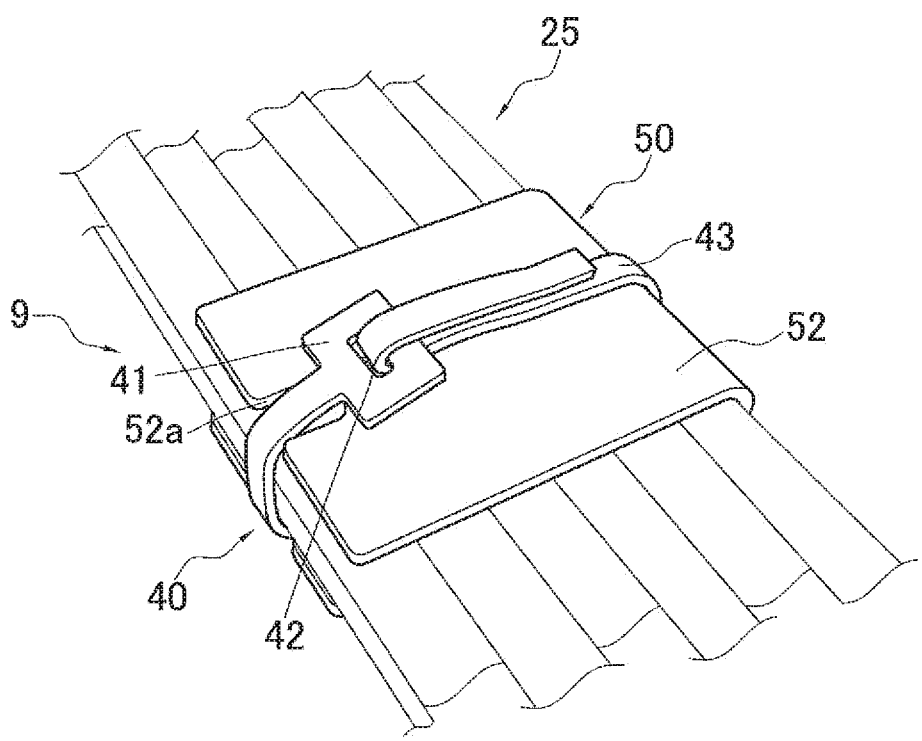
FIG. 9 is an external perspective view showing an example where the intercommunicating pipes are bundled together by the bundling component (a view seen from the front and below).
Figure 10:
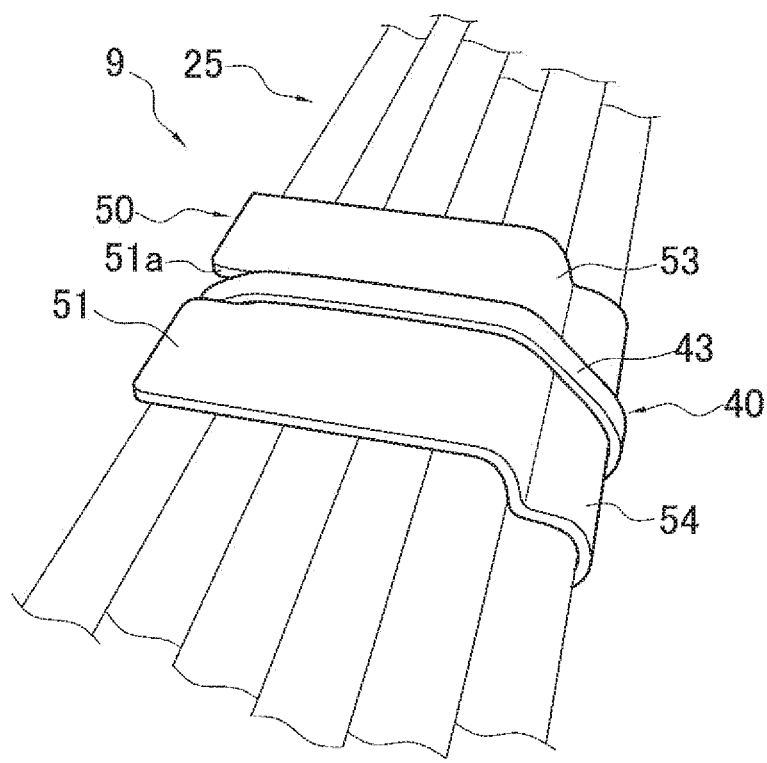
FIG. 10 is an external perspective view showing an example where the intercommunicating pipes are bundled together by the bundling component (a view seen from the back and below).

FIG. 7 to FIG. 10 are external perspective views of an example of a place where the intercommunicating pipes 25 are bundled together by the bundling component 9. Here, FIG. 7 is a front view, FIG. 8 is an external perspective view seen from the return header 24 side, FIG. 9 is an external perspective view seen from the front and below, and FIG. 10 is an external perspective view seen from the back and below.

The bundling component 9 is configured by a band member 40 and a clip 50.

Figure 11:
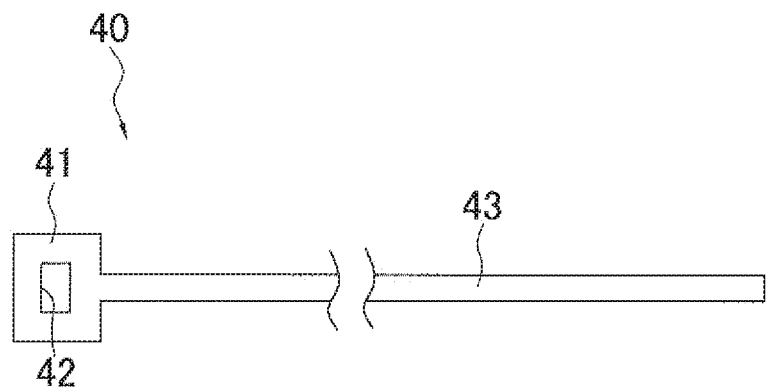
FIG. 11 is a plan view of a band member.

As shown in FIG. 11, which is a plan view, the band member 40 is a member that is made of aluminum or aluminum alloy and has a main body portion 41 and a band portion 43. The main body portion 41 has, on its inner side, an anchoring hole 42 that penetrates the main body portion 41 in its thickness direction. The band portion 43 extends out from part of the main body portion 41 and is formed narrower than the width of the anchoring hole 42 so as to be insertable into the anchoring hole 42. The band portion 43 can be bent by a human hand and has enough rigidity that it is difficult for it to become slack once it has been inserted into the anchoring hole 42 and bent. Furthermore, the rigidity of the band portion 43 is adjusted in such a way that the band portion 43 can sufficiently bundle together and secure the intercommunicating pipes 25 with just one wrap around.

Figure 12:
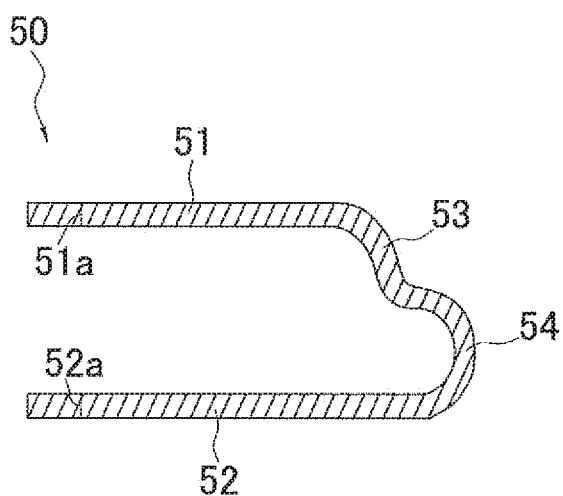
FIG. 12 is a side view of a clip.

As shown in FIG. 12, which is a side view, the clip 50 including a first wall surface portion 51, a second wall surface portion 52, a first curved surface portion 53, and a second curved surface portion 54 is a member that is made of aluminum or aluminum alloy. In the present embodiment, the clip 50 is exemplified by a clip that can accommodate the intercommunicating pipes 25a to 25j in two rows on the first wall surface portion 51 side and the second wall surface portion 52 side. The first wall surface portion 51 and the second wall surface portion 52 are planar sections extending in such a way as to face each other, and can sandwich and hold, in the thickness direction of the intercommunicating pipes 25a to 25j from the radial direction outer sides of the intercommunicating pipes 25a to 25j, the intercommunicating pipes 25a to 25j accommodated inside. Furthermore, the first curved surface portion 53 is configured to curve in such a way that its inner surface easily follows the peripheral surfaces of the intercommunicating pipes 25a to 25j accommodated on one end side of the first wall surface portion 51. The second curved surface portion 54 is also similarly configured to curve in such a way that its inner surface easily follows the peripheral surfaces of the intercommunicating pipes 25a to 25j accommodated on one end side of the second wall surface portion 52. The first curved surface portion 53 and the second curved surface portion 54 are continuous with each other via a smoothly curved surface. A first notch 51a for passing the band portion 43 of the band member 40 through is formed in the vicinity of the center of the end portion of the first wall surface portion 51 on the opposite side of the first curved surface portion 53 side. The width of the first notch 51a is configured to be larger than the width of the band portion 43 of the band member 40 and smaller than the width of the main body portion 41 of the band member 40. Similarly, a second notch 52a for passing the band portion 43 of the band member 40 through is also formed in the vicinity of the center of the end portion of the second wall surface portion 52 on the opposite side of the second curved surface portion 54 side. The width of the second notch 52a is also configured to be larger than the width of the band portion 43 of the band member 40 and smaller than the width of the main body portion 41 of the band member 40. The cut depth of the first notch 51a and the second notch 52a is shorter than the outer diameter of the intercommunicating pipes 25a to 25j.

(6) Brazing

A film comprising a coating of clad metal is formed on the outer surface of each of the intercommunicating pipes 25a to 25j of the intercommunicating component 25. The clad metal is a sacrificial material capable of protecting the outer surfaces of the intercommunicating pipes 25a to 25j from pitting corrosion and is not particularly limited; for example, an alloy such as aluminum 7072 including a trace amount (e.g., 1% or less) of zinc can be used. Furthermore, the melting point of the clad metal is lower than the melting point of the non-clad-metal sections of the intercommunicating pipes 25a to 25j of the intercommunicating component 25, so the clad metal can also function as a brazing material.

Furthermore, a film comprising a coating of the same clad metal as that on the outer surfaces of the intercommunicating pipes 25a to 25j is also formed on the surface of the clip 50 of the bundling component 9. It should be noted that there is no such coating with clad metal on time band member 40 of the bundling component 9.

In this way, the intercommunicating pipes 25a to 25j whose outer surfaces are coated with the clad metal are brazed in a furnace in a state in which they are bundled together by the bundling component 9 in such a way that they are in tight contact with each other.

Figure 13:
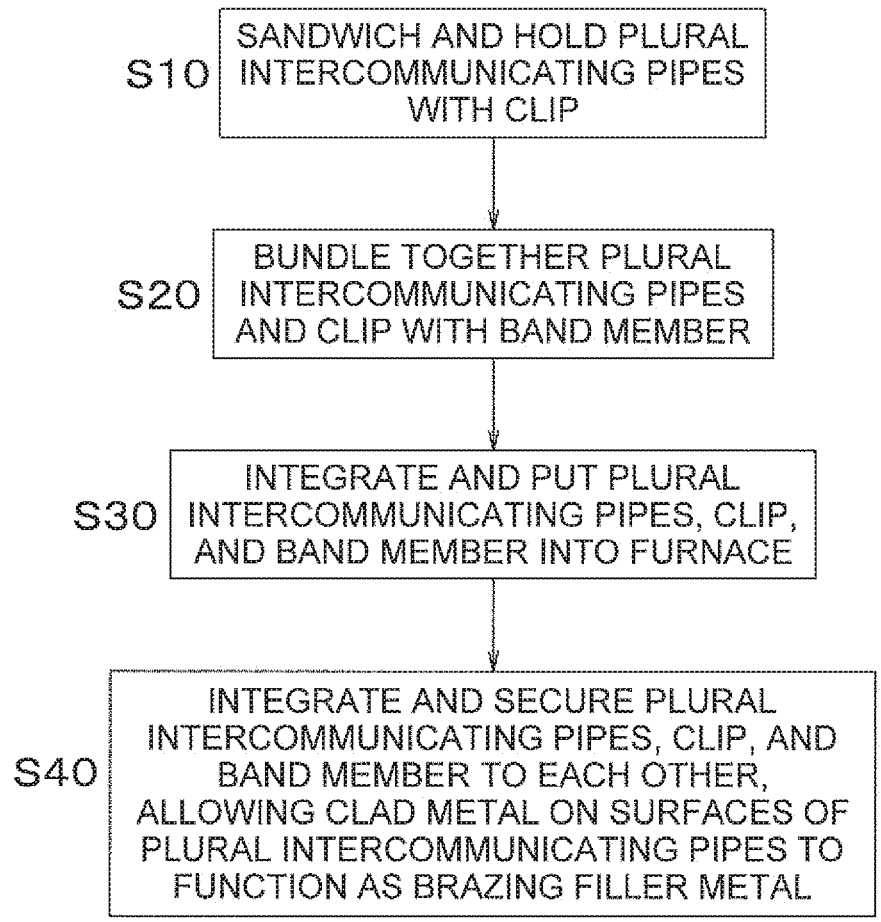
FIG. 13 is a flowchart of brazing and securing of the plural intercommunicating pipes and the bundling component 9 to each other.

Specifically, the intercommunicating pipes 25a to 25j and the bundling component 9 are integrated and secured to each other by a process according to the flowchart in FIG. 13.

In step S10, the intercommunicating pipes 25a to 25j coated with the clad metal are sandwiched and held, so as to be covered from their radial direction outer sides, by the clip 50 of the bundling component 9.

In step S20, the intercommunicating pipes 25a to 25j and the clip 50 sandwiching and holding them are further bundled together from their radial direction outer sides by the band member 40. Here, the main body portion 41 of the band member 40 is positioned on the outer side of the second wall surface portion 52, and the hand portion 43 of the band member 40 is looped around while being passed through the first notch 51a and the second notch 52a in the clip 50. The end portion of the band portion 43 on the opposite side of the main body portion 41 side is passed through the anchoring hole 42 and thereafter folded back to thereby fasten together and position the intercommunicating pipes 25a to 25j and the clip 50.

It should be noted that, here, the section of the clip 50 on the opposite side of the first curved surface portion 53 and the second curved surface portion 54 is open. Additionally, because the first notch 51a and the second notch 52a are provided in the clip 50, it is possible for the band portion 43 to contact and follow the outer peripheral surfaces of the intercommunicating pipes 25a to 25j positioned in the open section of the clip 50.

In step S30, the plural intercommunicating pipes 25a to 25j, the clip 50, and the band member 40 are put in their integrated state into a furnace.

Figure 14:
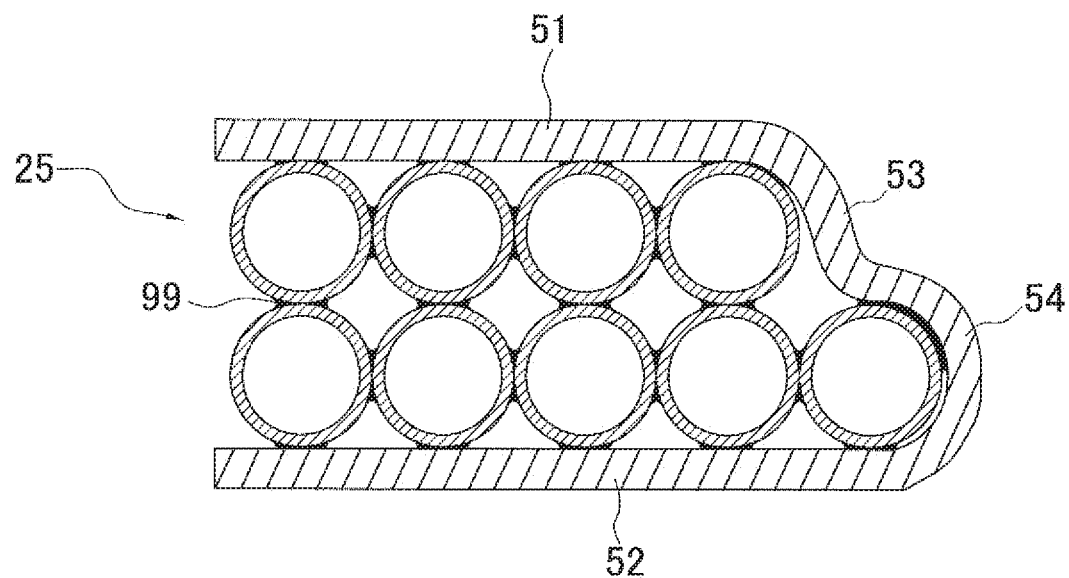
FIG. 14 is a cross-sectional view, along plane X-X of FIG. 7, showing a state in which the clip and the plural intercommunicating pipes are brazed and secured to each other.

In step S40, the temperature of the furnace is raised to a temperature higher than the melting point of the clad metal on the intercommunicating pipes 25a to 25j and the clip 50 and lower than the melting point of the non-clad-metal sections to thereby melt the clad metal and allow it to function as a brazing material. Because of this, some of the clad metal that had been positioned on the surfaces of the intercommunicating pipes 25a to 25j moves to the contacting sections between the intercommunicating pipes 25a to 25j and forms fillets 99 as shown in the sectional view of FIG. 14 (a view along section X-X of FIG. 7) to braze and secure the intercommunicating pipes 25a to 25j to each other. Furthermore, some of the clad metal that had been positioned on the surfaces of the intercommunicating pipes 25a to 25j also moves to the contacting sections between the inner surface of the clip 50 and the plural intercommunicating pipes 25a to 25j and forms fillets 99 to braze and secure the clip 50 and the intercommunicating pipes 25a to 25j to each other. Furthermore, the hand portion 43 of the band member 40 is brazed and secured to the plural intercommunicating pipes 25a to 25j at the sections where it contacts the outer surfaces of the plural intercommunicating pipes 25a to 25j.

In the way described above, the plural intercommunicating pipes 25a to 25j and the bundling component 9 are brazed and secured to each other.

(7) Characteristics

The band member 40 and the clip 50 that configure the bundling component 9 are made of aluminum or aluminum alloy, which is the same material as that of the intercommunicating pipes 25a to 25j that are the targets to be bundled together. For this reason, it is difficult for galvanic corrosion to arise between the bundling component 9 and the intercommunicating component 25 in their bundled and secured state.

Furthermore, the intercommunicating pipes 25a to 25j are put into the furnace in a state in which the intercommunicating pipes 25a to 25j are bundled together by the bundling component 9, so it is difficult for the intercommunicating pipes 25a to 25j to come apart, and the work of putting the intercommunicating pipes 25a to 25j into the furnace can be easily performed. Furthermore, because the intercommunicating pipes 25a to 25j are bundled together by the bundling component 9, the intercommunicating pipes 25a to 25j and the bundling component 9 can be put into the furnace while maintaining the state in which they are in tight contact with each other, so it becomes easier to guide the clad metal functioning as the brazing material to the tightly contacting sections, and the reliability of the securing can be enhanced.

Here, the bundling component 9 is made of aluminum or aluminum alloy whose melting point is, in contrast to that of resin, for example, higher than the melting point of the clad metal functioning as the brazing material, so the bundling component 9 can withstand the temperature in the furnace without melting.

Additionally, the bundling component 9 used to bundle together the intercommunicating pipes 25a to 25j is eventually brazed and secured to the intercommunicating pipes 25a to 25j. For this reason, by brazing and securing the intercommunicating pipes 25a to 25j and the bundling component 9 to each other rather than just br surface azing and securing the intercommunicating pipes 25a to 25j to each other, it becomes possible to make the securing structure stronger.

It should be noted that the present embodiment uses the clip 50 equipped with the first wall surface portion 51 and the second wall surface portion 52 that are wider in width than the band portion 43 of the band member 40. For this reason, it is possible to ensure that the length (a length in the longitudinal direction of the plural intercommunicating pipes 25a to 25j) of the sections of the plural intercommunicating pipes 25a to 25j where the plural intercommunicating pipes 25a to 25j are sandwiched and held by the clip 50 is sufficiently long. For this reason, it becomes possible to make the bundling and securing more stable.

(8) Example Modifications (8-1) Example Modification A

In the embodiment, a case of brazing and securing while the bundling component 9 equipped with the band member 40 and the clip 50 bundles together the intercommunicating pipes 25a to 25j was taken as an example and described.

Figure 15:
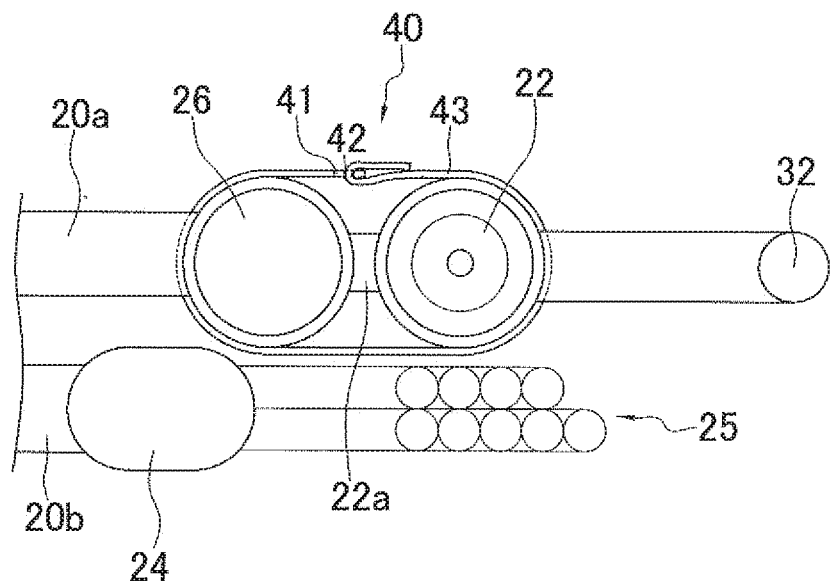
FIG. 15 is a configuration diagram showing dispositions as seen from above in an example where a band member pertaining to an example modification is securing a distributor and an inlet/outlet header.

However, the targets to be brazed and secured while being bundled together are not particularly limited, and arbitrary plural members that the outdoor heat exchanger 20 of the embodiment has may also be brazed to each other while being bundled together. For example, the distributor 22 and the inlet/outlet deader tube 26 may also be brazed and secured while being bundled together from their radial direction outer sides as with the band member 40 shown in FIG. 15.

Here, the distributor 22 and the inlet/outlet deader tube 26 are configured in such a way that, in a case where the outdoor heat exchanger 20 functions as a refrigerant evaporator, the flows of refrigerant distributed into plural flows in the up and down direction inside the distributor 22 flow into the lower section of the inlet/outlet deader tube 26 via plural passageways 22a provided so as to correspond to each position in the up and down direction. Here, in the lower section of the inlet/outlet deader tube 26 also, there are plural spaces partitioned in the up and down direction so as to correspond to the inside of the distributor 22. The multi-hole flat tubes 21b of the upwind-side heat exchange component 20a are connected to the plural spaces adjacent to each other in the up and down direction in the lower section of the inlet/outlet deader tube 26. Because of this, the flows of refrigerant distributed in the up and down direction in the distributor 22 flow to the multi-hole flat tubes 21b of the upwind-side heat exchange component 20a via the spaces in the lower section of the inlet/outlet deader tube 26 while maintaining their state of distribution.

Here, the radial direction outer surface of the distributor 22 and the outer surface of the inlet/outlet deader tube 26 are coated with the same clad metal as that of the intercommunicating pipes 25a to 25j of the embodiment.

Additionally, the distributor 22 and the inlet/outlet deader tube 26 coupled to each other via the passageways 22a are covered from their radial direction outer sides by the band portion 43 of the band member 40, and by putting them into a furnace in a state in which they are fastened to each other as a result of the end portion of the band portion 43 being anchored in the anchoring hole 42 in the main body portion 41, it becomes possible to braze and secure the distributor 22, the inlet/outlet deader tube 26, and the band member 40. Here, not only are the distributor 22, the inlet/outlet deader tube 26, and the passageways 22a brazed and secured to each other, but the distributor 22 and the inlet/outlet deader tube 26 are also brazed and secured to the band member 40.

(8-2) Example Modification B

In the embodiment, a case where the bundling component 9 is configured with the band member 40 and the clip 50 being separate from each other was taken as an example and described.

However, both members may also be integrally configured, for example, by providing the anchoring hole in part of the clip 50 and extending the band portion out from part of the clip.

(8-3) Example Modification C

In the embodiment, a case where clad metal functioning as a brazing material is provided on the surfaces of the plural intercommunicating pipes 25a to 25j and the surface of the clip 50 was taken as an example and described.

However, the plural members that become brazing targets are not limited to members having a brazing material provided on their surfaces in this way, and a brazing material may also be obtained from arbitrary targets other than the plural members that become brazing targets.

What is claimed is:
1. A heat exchanger comprising:
 a plurality of members made of aluminum or aluminum alloy and including
  a header with an inside partitioned into a plurality of spaces, and a plurality of intercommunicating pipes interconnecting the plurality of spaces, the plurality of intercommunicating pipes having convex outer surfaces; and a bundling component including
a main body portion having an anchoring portion, and
a band portion extending from the main body portion and having a section on an opposite side of a main body portion side anchored in the anchoring portion,
the bundling component being made of aluminum or aluminum alloy,
the bundling component bundling together the plurality of intercommunicating pipes,
the bundling component and the plurality of intercommunicating pipes being secured to each other with a brazing material interposed therebetween, and
the convex outer surfaces of the plurality of intercommunicating pipes contacting each other and being secured to each other with the brazing material interposed therebetween.

2. The heat exchanger according to claim 1, wherein
the bundling component includes a clip capable of sandwiching, the plurality of members and being made of aluminum or aluminum alloy,
sections of the plurality of members bundled together by the bundling component extending in a same direction,
the clip having a section with a width in the same direction, the width being larger than a width of the band portion,
the clip, the main body portion, and the band portion bundling together the plurality of intercommunicating pipes,
the clip, the main body portion, the band portion, and the plurality of intercommunicating pipes being secured to each other with a brazing material interposed therebetween, and
the clip including a first portion and a second portion, the first portion and the second portion sandwiching the plurality of intercommunicating pipes by the first portion and the second portion facing each other.

3. The heat exchanger according to claim 1, wherein
the plurality of members and the bundling component at least partially contact each other.

4. The heat exchanger according to claim 2, wherein
the plurality of members and the bundling component at least partially contact each.

* * * * *